United States Patent
Shin et al.

(10) Patent No.: US 10,969,009 B2
(45) Date of Patent: Apr. 6, 2021

(54) OIL COOLING APPARATUS FOR HYDROSTATIC TRANSMISSIONS

(71) Applicant: LS MTRON LTD., Anyang-si (KR)

(72) Inventors: Jai Yoon Shin, Anyang-si (KR); Jong Rak Choi, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 0 days.

(21) Appl. No.: 16/429,866

(22) Filed: Jun. 3, 2019

(65) Prior Publication Data
US 2019/0383389 A1 Dec. 19, 2019

(30) Foreign Application Priority Data

Jun. 14, 2018 (KR) .................. 10-2018-0068184
Jan. 24, 2019 (KR) .................. 10-2019-0009478

(51) Int. Cl.
*F16H 57/04* (2010.01)
*F16H 61/4165* (2010.01)

(52) U.S. Cl.
CPC ..... *F16H 61/4165* (2013.01); *F16H 57/0415* (2013.01)

(58) Field of Classification Search
CPC .. F16H 39/02; F16H 61/4165; F16H 57/0415; F16H 57/0416
See application file for complete search history.

(56) References Cited

U.S. PATENT DOCUMENTS 7,222,485 B2 * 5/2007 Shibata .................. F16H 39/02
60/456

FOREIGN PATENT DOCUMENTS

JP 2018-003683 A 1/2018

* cited by examiner

*Primary Examiner* — Abiy Teka
(74) *Attorney, Agent, or Firm* — K&L Gates LLP

(57) ABSTRACT

The present invention relates to an oil cooling apparatus for hydrostatic transmissions that includes a cooling main body coupled to a transmission case; an accommodating groove formed in the cooling main body to accommodate oil; a cover unit coupled to the cooling main body to cover the accommodating groove; a supply port configured to supply the oil to the accommodating groove; a discharge port configured to discharge the oil from the accommodating groove; a separating unit coupled to the cooling main body and configured to separate a flow path formed in the accommodating groove into a supply flow path connected to the supply port and a discharge flow path connected to the discharge port; and a hurdle unit coupled to each of an outer wall of the cooling main body and the separating unit, wherein the hurdle units may be formed to protrude from a bottom surface of the cooling main body so that an area of a flow region through which the oil passes is decreased.

10 Claims, 5 Drawing Sheets

OIL COOLING APPARATUS FOR HYDROSTATIC TRANSMISSIONS

CROSS-REFERENCE TO RELATED APPLICATIONS

Pursuant to 35 U.S.C. § 119(a), this application claims the benefit of earlier filing date and right of priority to Korean Patent Application No. 10-2018-0068184, filed on Jun. 14, 2018 and Korean Patent Application No. 10-2019-0009478 filed on Jan. 24, 2019, the disclosure of which is incorporated herein by reference in its entirety.

TECHNICAL FIELD

The present invention relates to an oil cooling apparatus for hydrostatic transmissions that is capable of cooling oil used in hydrostatic transmissions.

BACKGROUND ART

A hydrostatic transmission is used to adjust torque, velocity, and the like as needed during operation and traveling processes of a vehicle. The hydrostatic transmission may perform a shift operation of the vehicle by adjusting torque, velocity, and the like of power provided by a power source such as an engine. Oil is injected into the hydrostatic transmission to operate the hydrostatic transmission. The hydrostatic transmission may perform the shift operation of the vehicle using an oil pressure of the oil.

Here, in a process in which the oil passes through the hydrostatic transmission, the oil receives heat from the hydrostatic transmission, and a temperature of the oil rises. Because the temperature of the oil rises, an apparatus for cooling the oil is required.

However, an oil cooling apparatus for hydrostatic transmissions according to the related art requires a separate oil cooler for cooling oil. Accordingly, the oil cooling apparatus for hydrostatic transmissions according to the related art has a problem in that it requires a space for installing a separate oil cooler in a vehicle, which lowers the spatial efficiency and increases the manufacturing cost.

DISCLOSURE

Technical Problem

The present invention has been devised to solve the problem and is for providing an oil cooling apparatus for hydrostatic transmissions that does not require a separate oil cooler.

Technical Solution

To solve the above problem, the present invention may include the following configurations.

An oil cooling apparatus for hydrostatic transmissions according to the present invention may include a cooling main body coupled to a transmission case; an accommodating groove formed in the cooling main body to accommodate oil; a cover unit coupled to the cooling main body to cover the accommodating groove; a supply port configured to supply the oil to the accommodating groove; a discharge port configured to discharge the oil from the accommodating groove; a separating unit coupled to the cooling main body and configured to separate a flow path formed in the accommodating groove into a supply flow path connected to the supply port and a discharge flow path connected to the discharge port; and a hurdle unit coupled to each of an outer wall of the cooling main body and the separating unit, wherein the hurdle units may be formed to protrude from a bottom surface of the cooling main body so that an area of a flow region through which the oil passes is decreased.

Advantageous Effects

According to the present invention, the oil cooling apparatus for hydrostatic transmissions may have the following effects.

First, the present invention is implemented to be coupled to a transmission case to cool oil. Therefore, because the present invention does not require a separate oil cooler for a hydrostatic transmission, the spatial efficiency can be improved in relation to the vicinity of the hydrostatic transmission, and the manufacturing cost can be reduced.

Second, because the present invention is implemented to decrease an area of a flow region by hurdle units, as compared with the case in which the area of the flow region is not decreased, a flow velocity of the oil passing through the flow region can be increased. Here, when the flow velocity of the oil is increased, because heat transfer due to convection is increased, the amount of heat transferred from the oil to a cover unit can be increased. Therefore, because the present invention increases the amount of heat dissipated to the outside via the cover unit, the oil cooling performance can be improved.

DETAILED DESCRIPTION OF THE INVENTION

Hereinafter, embodiments of an oil cooling apparatus for hydrostatic transmissions according to the present invention will be described in detail with reference to the accompanying drawings.

Referring to FIGS. 1 to 5, an oil cooling apparatus 1 for hydrostatic transmissions according to the present invention cools oil used in an operation of a hydrostatic transmission. The oil cooling apparatus 1 for hydrostatic transmissions according to the present invention is coupled to a hydrostatic transmission (not illustrated) configured to adjust a velocity at which an agricultural vehicle, such as a tractor and a combine, travels. The hydrostatic transmission performs a shift function of adjusting the torque, velocity, and the like as needed in the agricultural vehicle. The hydrostatic transmission is installed in a transmission case 10.

To this end, the oil cooling apparatus 1 for hydrostatic transmissions according to the present invention includes a cooling main body 2 coupled to the transmission case 10; an accommodating groove 3 formed in the cooling main body 2 to accommodate oil; a cover unit 4 coupled to the cooling main body 2 to cover the accommodating groove 3; a supply port 5 configured to supply the oil to the accommodating groove 3; a discharge port 6 configured to discharge the oil from the accommodating groove 3; a separating unit 7 coupled to the cooling main body 2 and configured to separate a flow path formed in the accommodating groove 3 into a supply flow path connected to the supply port 5 and a discharge flow path connected to the discharge port 6; and a hurdle unit 8 coupled to each of an outer wall 2A of the cooling main body 2 and the separating unit 7.

The hurdle units 8 may be formed to protrude from a bottom surface of the cooling main body 2 so that an area of a flow region FA through which the oil passes is decreased. Accordingly, the oil cooling apparatus 1 for hydrostatic transmissions according to the present invention may have the following effects.

First, the oil cooling apparatus 1 for hydrostatic transmissions according to the present invention is implemented to be coupled to the transmission case 10 to cool oil. Therefore, because the oil cooling apparatus 1 for hydrostatic transmissions according to the present invention does not require a separate oil cooler for a hydrostatic transmission, the spatial efficiency can be improved in relation to the vicinity of the hydrostatic transmission, and the manufacturing cost can be reduced.

Second, because the oil cooling apparatus 1 for hydrostatic transmissions according to the present invention is implemented to decrease the area of the flow region FA by the hurdle units 8, as compared with the case in which the area of the flow region FA is not decreased, a flow velocity of the oil passing through the flow region FA can be increased. Here, when the flow velocity of the oil is increased, because heat transfer due to convection is increased, the amount of heat transferred from the oil to the cover unit 4 can be increased. Therefore, because the oil cooling apparatus 1 for hydrostatic transmissions according to the present invention increases the amount of heat dissipated to the outside via the cover unit 4, the oil cooling performance can be improved.

Hereinafter, the cooling main body 2, the accommodating groove 3, the cover unit 4, the supply port 5, the discharge port 6, the separating unit 7, and the hurdle units 8 will be described in detail with reference to the accompanying drawings.

Referring to FIGS. 1 to 5, the cooling main body 2 is coupled to the transmission case 10. The transmission case 10 serves as a case that couples components of the hydrostatic transmission. The cooling main body 2 serves as a main body of the oil cooling apparatus 1 for hydrostatic transmissions according to the present invention. The cooling main body 2 may be coupled to the transmission case 10 by a coupling member such as a bolt. The cooling main body 2 may be integrally formed with the transmission case 10.

Figure 1:
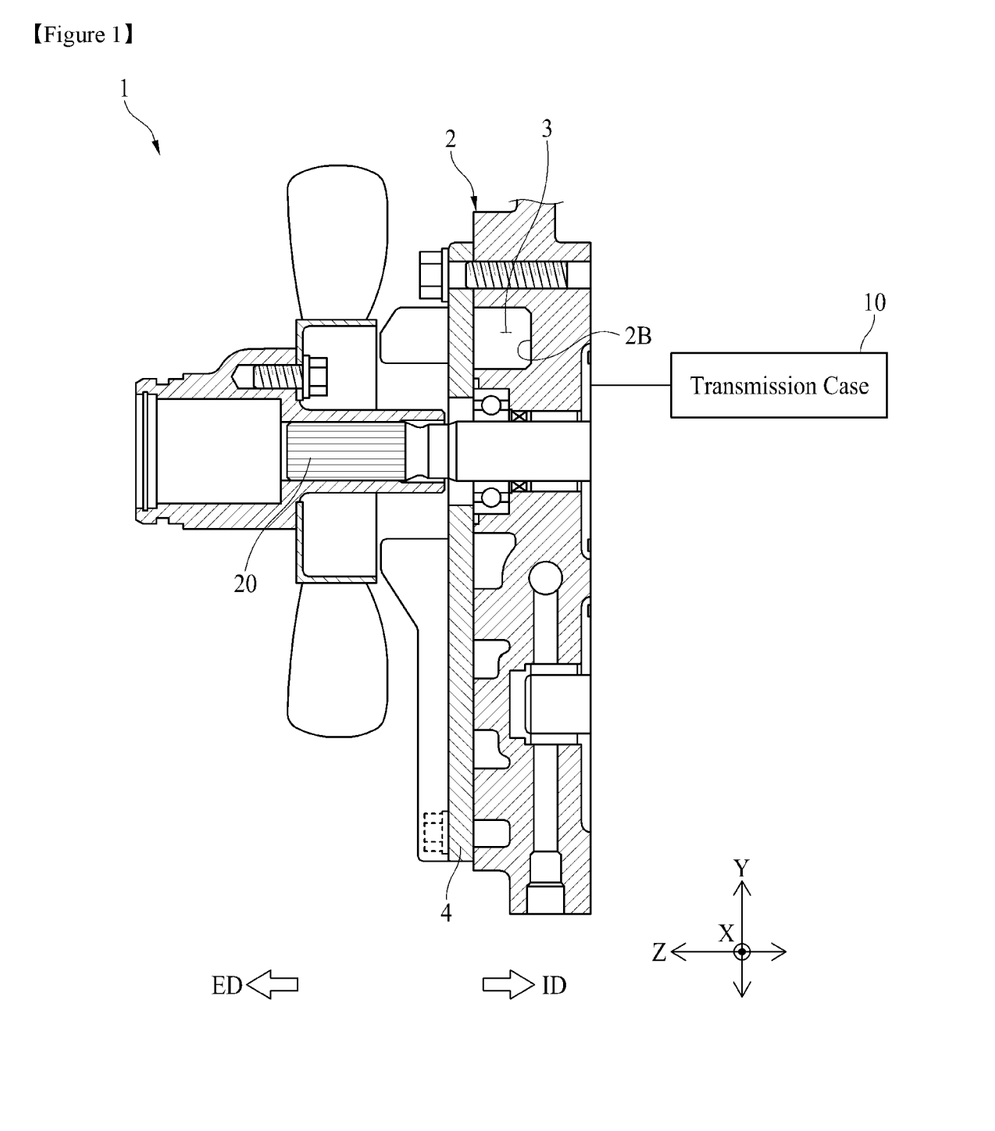
FIG. 1 is a schematic side cross-sectional view of an oil cooling apparatus for hydrostatic transmissions according to the present invention.
Figure 2:
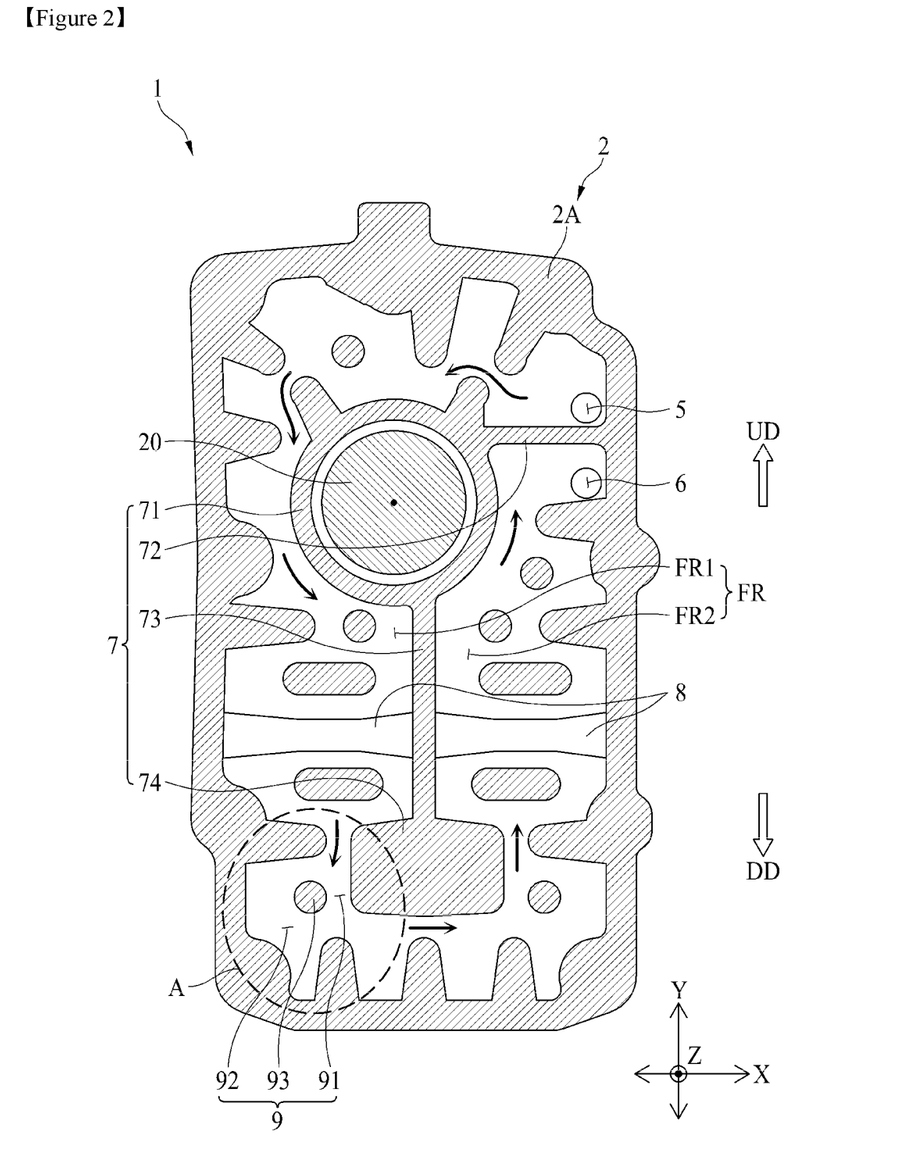
FIG. 2 is a schematic front cross-sectional view of the oil cooling apparatus for hydrostatic transmissions according to the present invention.

Referring to FIGS. 1 and 2, the cooling main body 2 may include the outer wall 2A and a bottom surface 2B.

The outer wall 2A serves as a structure of the cooling main body 2 that surrounds the accommodating groove 3. A coupling member such as a bolt may be coupled to the outer wall 2A so that the outer wall 2A receives a supporting force from the transmission case 10. The outer wall 2A may prevent leakage of the oil to the outside of the accommodating groove 3. The bottom surface 2B is one surface formed in the cooling main body 2 by the accommodating groove 3 and may be a surface facing an outward direction (a direction indicated by an arrow ED) in the cooling main body 2. The outward direction (the direction indicated by the arrow ED) is a direction from the accommodating groove 3 toward the cover unit 4. That is, the accommodating groove 3 may be formed in the cooling main body 2 through the cover unit 4, the bottom surface 2B, and the outer wall 2A.

Referring to FIGS. 1 to 5, the accommodating groove 3 accommodates the oil. The accommodating groove 3 may be formed in the cooling main body 2. The oil may be cooled while being accommodated in the accommodating groove 3. The accommodating groove 3 may be formed in the one surface facing the outward direction (the direction indicated by the arrow ED) in the cooling main body 2. Accordingly, as compared with the case in which the accommodating groove 3 is not formed in the one surface facing the outward direction (the direction indicated by the arrow ED) in the cooling main body 2, the oil cooling apparatus 1 for hydrostatic transmissions according to the present invention is implemented so that the oil is accommodated in a site that is further spaced apart from the transmission case 10 in the outward direction (the direction indicated by the arrow ED). Therefore, because the oil cooling apparatus 1 for hydrostatic transmissions according to the present invention is capable of decreasing the amount of heat generated by the hydrostatic transmission that is directly transferred from the hydrostatic transmission to the oil accommodated in the accommodating groove 3, the oil cooling performance can be further improved.

Referring to FIG. 2, a flow path FR may be formed in the accommodating groove 3. The flow path FR causes the oil to flow. That is, the flow path FR may serve as a path that allows the oil to flow in the accommodating groove 3. The flow path FR may correspond to either a portion of the accommodating groove 3 or the entire accommodating groove 3. The flow path FR may be connected to each of the supply port 5 and the discharge port 6. Therefore, the oil supplied via the supply port 5 may flow along the flow path FR and then be discharged via the discharge port 6. The flow path FR may include a supply flow path FR1 connected to the supply port 5 and a discharge flow path FR2 connected to the discharge port 6. The supply flow path FR1 and the discharge flow path FR2 may be formed by the separating unit 7.

Referring to FIGS. 1 and 2, the cover unit 4 is coupled to the cooling main body 2. The cover unit 4 (illustrated in FIG. 1) is coupled to the cooling main body 2. The cover unit 4 may be coupled to the cooling main body 2 so as to cover the accommodating groove 3. When the oil is supplied to the accommodating groove 3, the oil may flow along the accommodating groove 3 between the cooling main body 2 and the cover unit 4. The cover unit 4 may dissipate heat from the oil accommodated in the accommodating groove 3. Upon receiving heat from the oil accommodated in the accommodating groove 3, the cover unit 4 may dissipate the heat to the outside, thereby cooling the oil accommodated in the accommodating groove 3. The cover unit 4 may be coupled to the cooling main body 2 at a side opposite to the bottom surface 2B with respect to the accommodating groove 3. The cover unit 4 may be detachably coupled to the cooling main body 2. The cover unit 4 may be coupled to the cooling main body 2 by a fastening member such as a bolt. The cover unit 4 may be disposed in the outward direction (the direction indicated by the arrow ED) from the cooling main body 2.

Referring to FIG. 1, the cover unit 4 may include an inner surface 4A.

The inner surface 4A is one surface of the cover unit 4 adjacent to the accommodating groove 3. The inner surface 4A may face an inward direction (a direction indicated by an arrow ID) that is opposite the outward direction (the direction indicated by the arrow ED). The inner surface 4A may be disposed at a position opposite to the bottom surface 2B with respect to the accommodating groove 3. The inner surface 4A may receive heat from the oil accommodated in the accommodating groove 3. The heat transferred to the inner surface 4A may be dissipated from the cover unit 4 via a surface disposed in the outward direction (the direction indicated by the arrow ED).

Figure 5:
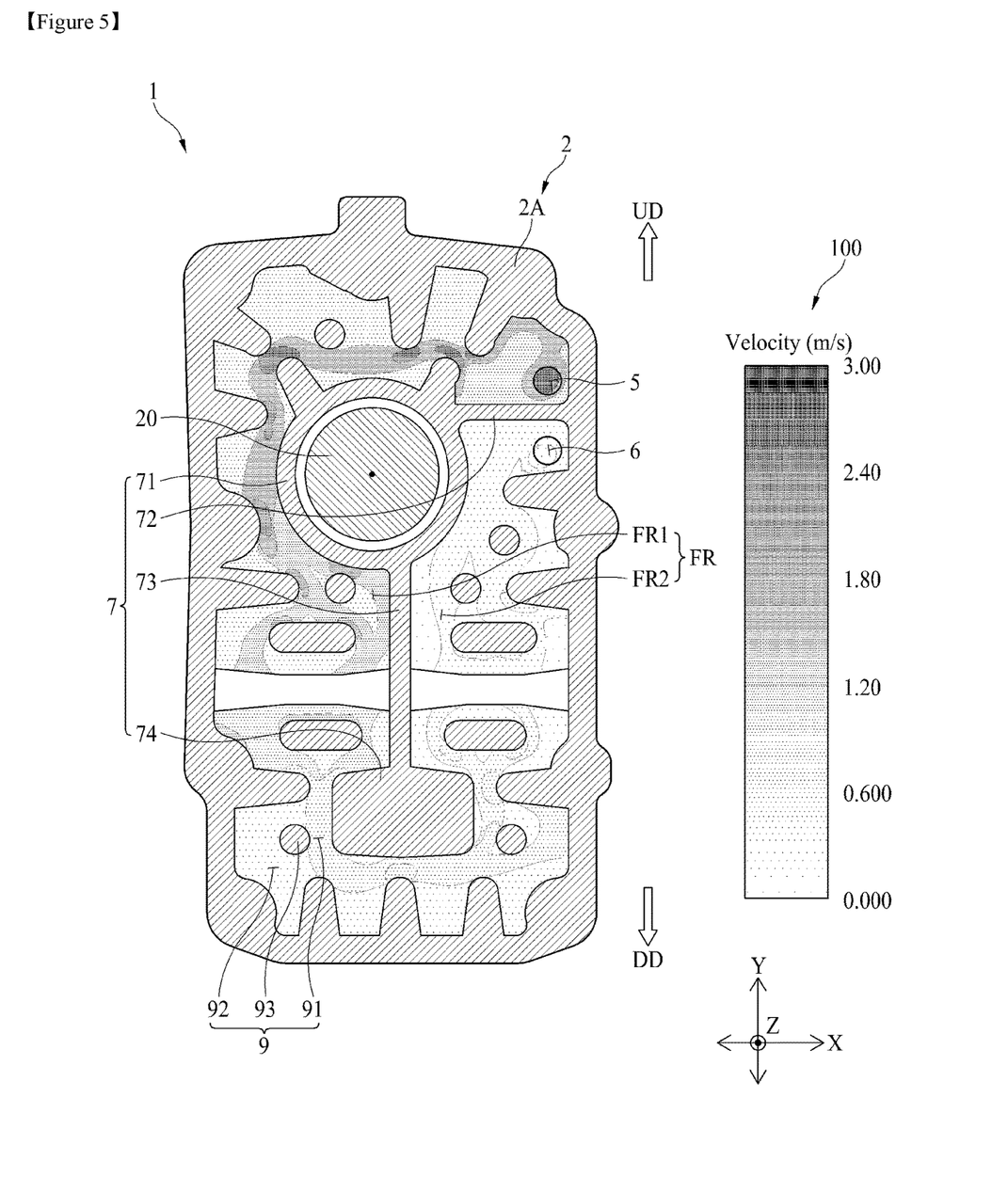
FIG. 5 is a schematic front cross-sectional view illustrating a velocity at which oil accommodated in an accommodating groove flows in the oil cooling apparatus for hydrostatic transmissions according to the present invention.

Referring to FIGS. 2 and 5, the supply port 5 supplies oil to the accommodating groove 3. The supply port 5 may be connected to each of a hydrostatic line in the hydrostatic transmission and the accommodating groove 3. Accordingly, the oil may flow along the hydrostatic line in the hydrostatic transmission and then be supplied to the accommodating groove 3 via the supply port 5. The supply port 5 may be formed in the bottom surface 2B. The supply port 5 may be connected to the supply flow path FR1.

Referring to FIGS. 2 and 5, the discharge port 6 discharges oil from the accommodating groove 3. The discharge port 6 may be connected to each of the hydrostatic line in the hydrostatic transmission and the accommodating groove 3. Accordingly, the oil supplied to the accommodating groove 3 via the supply port 5 may flow along the accommodating groove 3 and then be discharged again to the hydrostatic line in the hydrostatic transmission via the discharge port 6. The discharge port 6 may be formed in the bottom surface 2B. The discharge port 6 may be connected to the discharge flow path FR2. The discharge port 6 may be disposed at a position spaced apart from the supply port 5.

Referring to FIGS. 2 to 5, the separating unit 7 is coupled to the cooling main body 2. The separating unit 7 may separate the flow path FR into the supply flow path FR1 and the discharge flow path FR2. The separating unit 7 may be disposed in the accommodating groove 3. The separating unit 7 may be coupled to the outer wall 2A.

Referring to FIGS. 2 to 5, the separating unit 7 may include an installing member 71, a blocking member 72, a separating rib 73, and an expansion member 74.

An input shaft 20 is installed in the installing member 71. The input shaft 20 inputs power to the hydrostatic transmission. The input shaft 20 may be formed to extend in an inward-outward direction (Z-axis direction) that is parallel to each of the inward direction (the direction indicated by the arrow ID) and the outward direction (the direction indicated by the arrow ED). The installing member 71 may be formed to surround the input shaft 20 and prevent the oil accommodated in the accommodating groove 3 from coming into contact with the input shaft 20. The installing member 71 may be formed to protrude in the outward direction (the direction indicated by the arrow ED) from the bottom surface 2B. When the cover unit 4 is coupled to the cooling main body 2, the installing member 71 may come into contact with the cover unit 4 and keep the accommodating groove 3 sealed.

The blocking member 72 is coupled to each of the outer wall 2A and the installing member 71. The blocking member 72 may separate the flow path FR into the supply flow path FR1 and the discharge flow path FR2. The blocking member 72 may be disposed on the shortest path connecting the supply port 5 and the discharge port 6. The blocking member 72 may block the shortest path along which the oil supplied via the supply port 5 flows toward the discharge port 6.

Accordingly, the oil cooling apparatus 1 for hydrostatic transmissions according to the present invention is implemented to prevent the case in which the oil supplied via the supply port 5 immediately flows toward the discharge port 6 instead of flowing by bypassing along the supply flow path FR1 and the discharge flow path FR2. Therefore, the oil cooling apparatus 1 for hydrostatic transmissions according to the present invention may increase the overall length along which the oil flows, thereby increasing time during which the oil stays in the accommodating groove 3 and further improving the oil cooling performance.

The blocking member 72 may be coupled to the side of the outer wall 2A adjacent to each of the supply port 5 and the discharge port 6. The blocking member 72 may be formed in the form of a quadrangular plate having a uniform overall thickness.

The separating rib 73 is coupled to the installing member 71. The separating rib 73 may extend in a downward direction (a direction indicated by an arrow DD). The downward direction (the direction indicated by the arrow DD) may be a direction from the supply port 5 toward the discharge port 6. Along the separating rib 73, the supply flow path FR1 and the discharge flow path FR2 may be formed to extend in the downward direction (the direction indicated by the arrow DD).

Accordingly, the oil cooling apparatus 1 for hydrostatic transmissions according to the present invention is implemented so that a length at which the supply flow path FR1 and the discharge flow path FR2 extend in the downward direction (the direction indicated by the arrow DD) due to the separating rib 73 increases. Therefore, because the oil cooling apparatus 1 for hydrostatic transmissions according to the present invention not only increases a bypass radius at which the oil bypasses on the way to the discharge port 6 but also increases the lengths of the supply flow path FR1 and the discharge flow path FR2, the time during which the oil stays in the accommodating groove 3 can be further increased. Accordingly, because the oil cooling apparatus 1 for hydrostatic transmissions according to the present invention increases the time during which the oil is cooled, the oil cooling performance can be further improved.

A working fluid that has flowed through the supply flow path FR1 may turn around at one side of the separating rib 73 and be introduced into the discharge flow path FR2. The one side of the separating rib 73 may be disposed at a position spaced apart from the outer wall 2A. The other side of the separating rib 73 may be coupled to the installing member 71. The separating rib 73 and the installing member 71 may be integrally formed. The separating rib 73 may be formed in the form of a quadrangular plate having a uniform overall thickness, but embodiments are not limited thereto, and the separating rib 73 may be formed in any other form as long as the form extends in the downward direction (the direction indicated by the arrow DD). For example, the separating rib 73 may be formed in the form of a curved plate so that the flow resistance of the oil is decreased. The separating rib 73 may be disposed in the vicinity of the center of the accommodating groove 3 so that areas of flow regions FA of the supply flow path FR1 and the discharge flow path FR2 are substantially the same. The flow region FA may be a cross-section of the flow path FR taken in a direction perpendicular to a flow direction of a main flow of the oil. The main flow of the oil refers to a mainstream of the oil passing through the flow path.

The expansion member 74 is coupled to the separating rib 73. The expansion member 74 may be formed to have a longer length in a horizontal direction (X-axis direction) than the separating rib 73. The horizontal direction (X-axis direction) is a direction perpendicular to each of the inward-outward direction (Z-axis direction) and a vertical direction (Y-axis direction). The vertical direction (Y-axis direction) is a direction parallel to each of the downward direction (the direction indicated by the arrow DD) and an upward direction (a direction indicated by an arrow UD) which is opposite the downward direction (the direction indicated by the arrow DD). The expansion member 73 may increase a distance at which the supply flow path FR1 and the discharge flow path FR2 are spaced apart from each other in the horizontal direction (X-axis direction). Accordingly, the oil cooling apparatus 1 for hydrostatic transmissions according to the present invention may have the following effects.

First, the oil cooling apparatus 1 for hydrostatic transmissions according to the present invention is implemented so that, due to the expansion member 74, each of a main flow of oil flowing through the supply flow path FR1 and a main flow of oil flowing through the discharge flow path FR2 flows at a site adjacent to the outer wall 2A. Therefore, the oil cooling apparatus 1 for hydrostatic transmissions according to the present invention may increase the amount of heat transferred to the outer wall 2A during a process in which the oil flows. Therefore, because the oil cooling apparatus 1 for hydrostatic transmissions according to the present invention increases the amount of heat transferred to the cover unit 4 via the outer wall 2A, the oil cooling performance can be improved.

Second, because the oil cooling apparatus 1 for hydrostatic transmissions according to the present invention not only increases a bypass radius at which the oil flows by bypassing along the expansion member 74 but also increases the lengths of the supply flow path FR1 and the discharge flow path FR2, the time during which the oil stays in the accommodating groove 3 can be further increased. Accordingly, because the oil cooling apparatus 1 for hydrostatic transmissions according to the present invention increases the time during which the oil is cooled, the oil cooling performance can be further improved.

The expansion member 74 may be coupled to the one side of the separating rib 73. The expansion member 74 and the separating rib 73 may be integrally formed. The expansion member 74 may be formed in the form of a quadrangular column as a whole, but embodiments are not limited thereto, and the expansion member 74 may be formed in any other form as long as it is formed to have a longer length in the horizontal direction (X-axis direction) than the separating rib 73. For example, the expansion member 74 may also be formed in a cylindrical shape.

Figure 3:
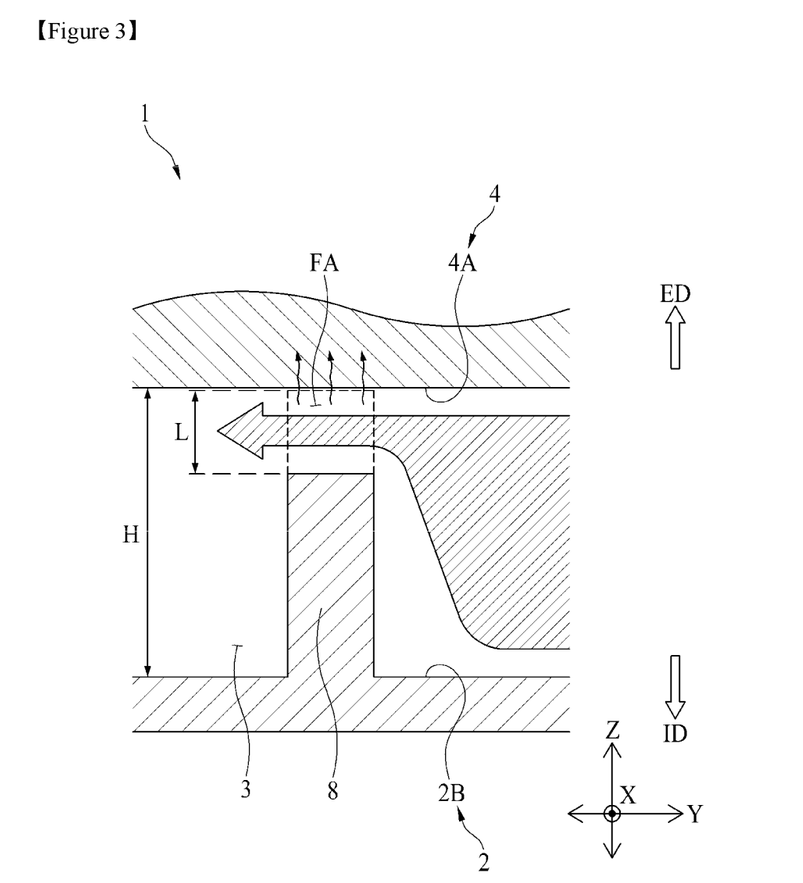
FIG. 3 is a schematic side cross-sectional view illustrating a state in which oil passes through a flow region formed by hurdle units in the oil cooling apparatus for hydrostatic transmissions according to the present invention.

Referring to FIGS. 2 to 5, the hurdle units 8 may be coupled to the outer wall 2A and the separating rib 73. The hurdle units 8 may be formed to protrude from the bottom surface 2B. The hurdle units 8 may decrease the area of the flow region FA. As illustrated in FIG. 3, a flow velocity of the oil may be increased as the oil flows from the flow region FA having a large area to the flow region FA formed by the hurdle units 8.

Accordingly, the oil cooling apparatus 1 for hydrostatic transmissions according to the present invention increases the flow velocity of the oil passing through the flow region FA formed by the hurdle units 8, thereby increasing the amount of heat transferred from the oil to the cover unit 4. This is because convection heat transfer related to the oil increases as the flow velocity of the oil increases. Therefore, because the oil cooling apparatus 1 for hydrostatic transmissions according to the present invention increases the amount of heat dissipated to the outside via the cover unit 4, the oil cooling performance can be improved.

Referring to FIGS. 2 and 5, the hurdle units 8 may be disposed in at least one of the supply flow path FR1 and the discharge flow path FR2. When a plurality of hurdle units 8 are formed, the hurdle units 8 may be disposed only on the supply flow path FR1 while being spaced apart from each other, disposed only on the discharge flow path FR2 while being spaced apart from each other, or disposed on each of the supply flow path FR1 and the discharge flow path FR2. Accordingly, as compared with the case in which only a single hurdle unit 8 is formed, because an area of the flow region FA in which the flow velocity of the oil increases is increased in the oil cooling apparatus 1 for hydrostatic transmissions according to the present invention, the oil cooling performance can be further improved.

When the hurdle units 8 are disposed only on the supply flow path FR1, the hurdle units 8 may be disposed at positions spaced apart from each other in the vertical direction (Y-axis direction). In this case, because the oil cooling apparatus 1 for hydrostatic transmissions according to the present invention increases the convection heat transfer related to the oil on the supply flow path FR1 in which a temperature of the oil is relatively high, there is an advantage in that the oil cooling performance can be further improved. When the hurdle units 8 are disposed only on the discharge flow path FR2, the hurdle units 8 may be disposed at positions spaced apart from each other in the vertical direction (Y-axis direction). When the hurdle units 8 are disposed on each of the supply flow path FR1 and the discharge flow path FR2, the hurdle units 8 may be disposed at positions spaced apart from each other in the horizontal direction (X-axis direction). In this case, because the area of the flow region FA, in which the flow velocity of the oil increases, is increased by the plurality of hurdle units 8 while the hurdle units 8 are disposed on each of the supply flow path FR1 and the discharge flow path FR2 in the oil cooling apparatus 1 for hydrostatic transmissions according to the present invention, there is an advantage in that the spatial efficiency can be improved in relation to the accommodating groove 3.

Referring to FIGS. 2 and 5, the hurdle units 8 may be formed to extend in a direction perpendicular to a flow direction of a main flow of the oil.

Referring to FIG. 3, the hurdle units 8 may be formed at positions spaced apart from the inner surface 4A in the inward direction (the direction indicated by the arrow ID). That is, the flow region FA may be formed between the inner surface 4A and the hurdle units 8. The flow region FA may be formed at a site adjacent to the inner surface 4A. Therefore, the flow velocity of the oil passing through the flow region FA formed by the hurdle units 8 may be increased at the site adjacent to the inner surface 4A.

Accordingly, because the oil with an increased flow velocity flows at the site adjacent to the inner surface 4A in the oil cooling apparatus 1 for hydrostatic transmissions according to the present invention, the amount of heat transferred from the oil to the inner surface 4A may be increased. Therefore, as compared with the case in which the flow region FA is not formed at the site adjacent to the inner surface 4A, because the oil cooling apparatus 1 for hydrostatic transmissions according to the present invention significantly increases the amount of heat dissipated to the outside via the cover unit 4, the oil cooling performance can be further improved.

Referring to FIG. 3, the hurdle units 8 may be formed so that a ratio of a length L of the flow region FA to a distance H at which the bottom surface 2B and the inner surface 4A are spaced apart from each other is within 10% in the inward-outward direction (Z-axis direction). When the ratio of the length L of the flow region FA to the distance H at which the bottom surface 2B and the inner surface 4A are spaced apart from each other exceeds 10%, the flow velocity of the oil passing through the flow region FA formed by the hurdle units 8 may not be sufficiently increased, and the oil may flow at a position at which a distance at which the hurdle units 8 are spaced apart from the inner surface 4A in the inward direction (the direction indicated by the arrow ID) is increased. Accordingly, because the convection heat transfer from the oil to the inner surface 4A decreases, there is a disadvantage in that the amount of heat dissipated to the outside via the cover unit 4 is decreased. Meanwhile, when the ratio of the length L of the flow region FA to the distance H at which the bottom surface 2B and the inner surface 4A are spaced apart from each other is within 10%, the flow velocity of the oil passing through the flow region FA formed by the hurdle units 8 may be sufficiently increased, and the oil may flow at a position at which a distance at which the hurdle units 8 are spaced apart from the inner surface 4A in the inward direction (the direction indicated by the arrow ID) is decreased. Accordingly, because the convection heat transfer from the oil to the inner surface 4A increases, there is an advantage in that the amount of heat dissipated to the outside via the cover unit 4 is increased.

Referring to FIGS. 2 to 5, the oil cooling apparatus 1 for hydrostatic transmissions according to the present invention may include a mixing unit 9.

The mixing unit 9 mixes the oil flowing along the flow path FR. The mixing unit 9 may constitute a portion of the flow path FR. The oil introduced into the mixing unit 9 may be mixed and flow at a relatively uniform temperature. A plurality of mixing units 9 may be formed. For example, the mixing unit 9 may be formed in each of the supply flow path FR1 and the discharge flow path FR2. The mixing unit 9 may be disposed at a site at which a direction of the oil is switched from the supply flow path FR1 to the discharge flow path FR2. In this case, the mixing unit 9 may mix the oil using the inertia of the oil generated in a process in which the direction of the oil is switched. The mixing unit 9 may be disposed substantially in the downward direction (the direction indicated by the arrow DD) from the separating rib 73.

Referring to FIGS. 2 to 5, the mixing unit 9 may include a mixing flow path 91, a mixing space 92, and an adjusting member 93.

The mixing flow path 91 causes the oil flowing through the flow path FR to flow. The mixing flow path 91 may cause the main flow of the oil to flow. The oil flowing through the mixing flow path 91 may flow at a relatively higher flow velocity than the oil flowing through the mixing space 92.

The mixing space 92 is a space formed to be connected to the mixing flow path 91. A portion of the oil flowing through the mixing flow path 91 may be branched and introduced into the mixing space 92. The mixing space 92 may mix the oil branched from the main flow of the oil and cause the branched oil to flow toward the mixing flow path 91. Accordingly, a recirculation zone in which the branched oil circulates may be formed in the mixing space 92. The recirculation zone is a zone in which the branched oil circulates and is mixed. The recirculation zone may serve to homogenize a temperature of the branched oil. Accordingly, the oil cooling apparatus 1 for hydrostatic transmissions according to the present invention may have the following effects.

First, the oil cooling apparatus 1 for hydrostatic transmissions according to the present invention is implemented to increase the time during which the oil stays in the accommodating groove 3 due to the recirculation zone formed in the mixing space 92. Therefore, the oil cooling apparatus 1 for hydrostatic transmissions according to the present invention further increases the time during which the oil is cooled in the accommodating groove 3, thereby further improving the oil cooling performance.

Second, the oil cooling apparatus 1 for hydrostatic transmissions according to the present invention is implemented so that the oil flowing at a position adjacent to the inner surface 4A and the oil flowing at a position spaced apart from the inner surface 4A in the inward direction (the direction indicated by the arrow ID) are mixed in the mixing space 92. Therefore, because the oil cooling apparatus 1 for hydrostatic transmissions according to the present invention increases an average temperature of the oil flowing at the position adjacent to the inner surface 4A, the amount of heat dissipated to the outside via the cover unit 4 may be increased, and thus the oil cooling performance can be further improved.

Such effects can be seen from FIG. 5 that shows a result of three-dimensional computational fluid dynamics (CFD) analysis as the oil accommodated in the accommodating groove 3 is caused to flow from the supply port 5 to the discharge port 6 in an embodiment of the oil cooling apparatus 1 for hydrostatic transmissions according to the present invention. FIG. 5 is an experimental result showing a velocity at which the oil accommodated in the accommodating groove 3 flows while the cover unit 4 is coupled to the cooling main body 2 in the oil cooling apparatus 1 for hydrostatic transmissions according to the present invention. Referring to a bar 100 shown on the right side of FIG. 5, it can be seen that the velocity at which the oil accommodated in the accommodating groove 3 flows is distinguished by density of dots. That is, the velocity of the oil is higher as the density of the dots becomes higher, and the velocity of the oil is lower as the density of the dots becomes lower.

As illustrated in FIG. 5, it can be seen that a velocity of a branched flow of oil flowing through the mixing space 92 is lower than a velocity of the main flow of oil flowing through the mixing flow path 91. The decrease in the velocity of oil is due to the recirculation zone formed in the mixing space 92, and accordingly, it can be recognized that the oil at a high temperature and the oil at a low temperature are mixed in the mixing space 92.

Hereinafter, a process in which the mixing space 92 mixes branched oil and causes the mixed oil to flow toward the mixing flow path 91 will be described in detail with reference to the accompanying drawings. The main flow of oil flowing through the mixing flow path 91 is indicated by a thick solid line. Meanwhile, a branched flow of oil branched from the main flow of oil is indicated by a broken line.

Figure 4:
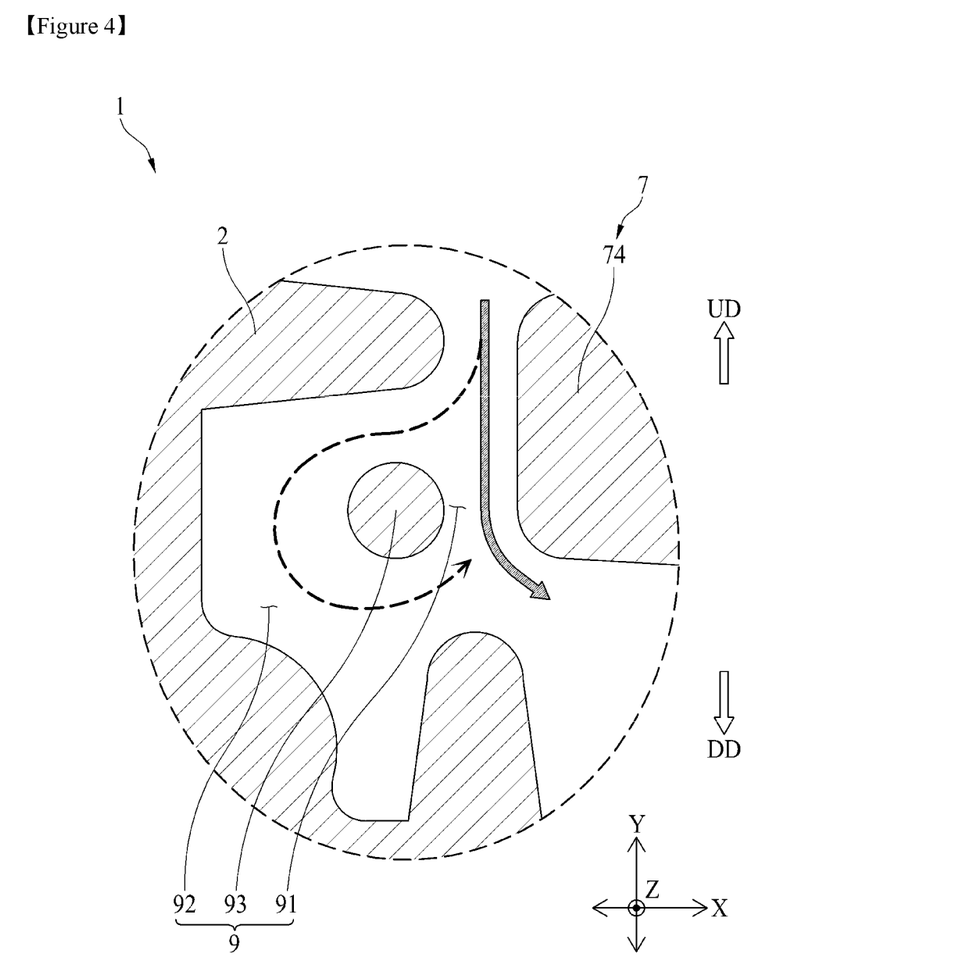
FIG. 4 is a schematic enlarged view of portion A in FIG. 2 of the oil cooling apparatus for hydrostatic transmissions according to the present invention.

First, referring to FIG. 4, the oil that has flowed through the flow path FR is introduced into the mixing flow path 91. For example, referring to FIG. 4, the oil may flow substantially in the downward direction (the direction indicated by the arrow DD) and be introduced into the mixing flow path 91.

Next, the main flow of oil may flow through the mixing flow path 91. Meanwhile, branched flows branched from the main flow of oil flowing through the mixing flow path 91 may be introduced into the mixing space 92. The branched flows introduced into the mixing space 92 may be mixed with each other while forming a recirculation zone in the mixing space 92. For example, referring to FIG. 4, the branched flows introduced into the mixing space 92 may be mixed while circulating counterclockwise.

Next, the branched flows flowing through the mixing space 92 may flow to the mixing flow path 91. The branched flows flowing through the mixing space 92 may flow to the mixing flow path 91 and then join the main flow flowing through the mixing flow path 91.

The adjusting member 93 is disposed between the mixing flow path 91 and the mixing space 92. The adjusting member 93 may block a portion between the mixing flow path 91 and the mixing space 92. The adjusting member 93 may adjust a flow rate of oil branched toward the mixing space 92.

Accordingly, the oil cooling apparatus 1 for hydrostatic transmissions according to the present invention is implemented so that the adjusting member 93 adjusts a flow rate of the branched flows flowing through the mixing space 92 even when the size of the mixing space 92 is large. When the flow rate of the branched flows is excessively increased with respect to the flow rate of the main flow, a problem may occur in which, even when the branched flows flowing through the mixing space 92 are completely cooled, the branched flows continue to circulate through the mixing space 92 instead of flowing toward the mixing flow path 91. Therefore, because the oil cooling apparatus 1 for hydrostatic transmissions according to the present invention lowers a degree at which the cooled oil circulates in the mixing space 92 instead of flowing through the mixing flow path 91, the oil cooling performance can be further improved, and a decrease in the amount of oil introduced into the accommodating groove 3 via the supply port 5 may be prevented.

The present invention is not limited to the above-described exemplary embodiments and the accompanying drawings, and it will be apparent to those of ordinary skill in the art to which the present invention pertains that various changes, substitutions and alterations may be made herein without departing from the scope of the present invention.

The invention claimed is:

1. An oil cooling apparatus for hydrostatic transmissions, the oil cooling apparatus comprising:
a cooling main body coupled to a transmission case;
an accommodating groove formed in the cooling main body to accommodate oil;
a cover unit coupled to the cooling main body to cover the accommodating groove;
a supply port configured to supply the oil to the accommodating groove;
a discharge port configured to discharge the oil from the accommodating groove;
a separating unit coupled to the cooling main body and configured to separate a flow path (FR) formed in the accommodating groove into a supply flow path (FR1) connected to the supply port and a discharge flow path (FR2) connected to the discharge port; and
a hurdle unit coupled to each of an outer wall (2A) of the cooling main body and the separating unit,
wherein the hurdle unit is formed to protrude from a bottom surface (2B) of the cooling main body so that an area of a flow region (FA) through which the oil passes is decreased,
wherein an upper surface of the hurdle unit is disposed at a position spaced apart from an inner surface (4A) of the cover unit,
wherein the flow path (FR) is formed between the bottom surface (2B) of the cooling main body and the inner surface (4A) of the cover unit,
wherein the flow region (FA) is formed between the upper surface of the hurdle unit and the inner surface (4A) of the cover unit by the hurdle unit protruded from the bottom surface (2B) of the cooling main body.

2. The oil cooling apparatus of claim 1, wherein the hurdle unit is disposed on at least one of the supply flow path (FR1) and the discharge flow path (FR2).

3. The oil cooling apparatus of claim 1, wherein the hurdle unit is formed to extend in a direction perpendicular to a flow direction of a main flow of the oil.

4. The oil cooling apparatus of claim 1, wherein, in an inward-outward direction (a Z-axis direction) that is parallel to each of an inward direction (a direction indicated by an arrow (ID)), which is a direction from the cover unit toward the bottom surface (2B), and an outward direction (a direction indicated by an arrow (ED)), which is opposite the inward direction (the direction indicated by the arrow (ID)), the hurdle unit 8 is formed so that a ratio of a length of the flow region (FA) to a distance at which the bottom surface (2B) and the inner surface (4A) of the cover unit are spaced apart from each other is within 10%.

5. The oil cooling apparatus of claim 1, further comprising a mixing unit configured to mix the oil flowing along the flow path (FR),
wherein the mixing unit includes a mixing flow path and a mixing space connected to the mixing flow path,
wherein the mixing flow path is configured to cause the oil flowing through the flow path (FR) to flow,
wherein the mixing space is configured to mix the oil branched from the oil flowing through the mixing flow path and cause the branched oil to flow toward the mixing flow path.

6. The oil cooling apparatus of claim 5, wherein:
the mixing unit is provided in plural; and
the mixing units are disposed at positions spaced apart from each other along the flow path (FR).

7. The oil cooling apparatus of claim 5, further comprising an adjusting member disposed between the mixing flow path and the mixing space,
wherein the adjusting member blocks a portion between the mixing flow path and the mixing space to adjust a flow rate of the oil branched toward the mixing space.

8. The oil cooling apparatus of claim 1, wherein the separating unit includes an installing member having an input shaft for inputting power to a hydrostatic transmission installed, a blocking member coupled to each of the outer wall (2A) and the installing member, and a separating rib coupled to the installing member to extend in a downward direction (a direction indicated by an arrow (DD)), which is a direction from the supply port toward the discharge port.

9. The oil cooling apparatus of claim 8, wherein the blocking member is disposed on the shortest path connecting the supply port and the discharge port and blocks a flow toward the discharge port of the oil supplied via the supply port.

10. The oil cooling apparatus of claim 8, wherein:
the separating unit includes an expansion member coupled to the separating rib; and
the expansion member is formed to have a longer length in a horizontal direction (X-axis direction) than the separating rib so that a distance at which an oil flowing from the supply flow path (FR1) to the discharge flow path (FR2) flows is increased in the horizontal direction (X-axis direction).

\* \* \* \* \*